United States Patent
Reithmeir et al.

(10) Patent No.: US 11,500,512 B2
(45) Date of Patent: Nov. 15, 2022

(54) METHOD AND SYSTEM FOR VIEWING VIRTUAL ELEMENTS

(71) Applicant: Siemens Aktiengesellschaft, Munich (DE)

(72) Inventors: Anna Reithmeir, Munich (DE); Robert Wilde, Munich (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 17/428,314

(22) PCT Filed: Jan. 29, 2020

(86) PCT No.: PCT/EP2020/052098
§ 371 (c)(1),
(2) Date: Aug. 4, 2021

(87) PCT Pub. No.: WO2020/164906
PCT Pub. Date: Aug. 20, 2020

(65) Prior Publication Data
US 2022/0129079 A1    Apr. 28, 2022

(30) Foreign Application Priority Data

Feb. 11, 2019   (EP) ...................... 19156426

(51) Int. Cl.
*G06F 3/04815*    (2022.01)
*G06V 20/20*    (2022.01)
(Continued)

(52) U.S. Cl.
CPC .......... *G06F 3/04815* (2013.01); *G06F 3/011* (2013.01); *G06F 3/017* (2013.01);
(Continued)

(58) Field of Classification Search
CPC ...... G06F 3/017; G06F 3/011; G06F 3/04815; G06F 3/04845; G06F 3/0485; G06T 19/006; G06V 20/20
See application file for complete search history.

(56) References Cited

U.S. PATENT DOCUMENTS 6,771,294 B1    8/2004   Pulli et al.
10,429,923 B1 *  10/2019  Johnston ................ G02B 7/002
(Continued)

OTHER PUBLICATIONS

"Leap Motion", obtainable on the internet on Jan. 15, 2019 at https://en.wikipedia.org/wiki/Leap_Motion.
(Continued)

*Primary Examiner* — Mong-Shune Chung
(74) *Attorney, Agent, or Firm* — Schmeiser, Olsen & Watts LLP

(57) ABSTRACT

A tracking device tracks hand motion of a user. An output device, for example an augmented reality headset or a virtual reality headset, is configured for the output of virtual elements in augmented or virtual reality. A processor recognizes a first gesture when the user turns a palm of a first hand towards his face. The processor then displays a set of virtual elements above the palm of the first hand, the virtual elements being arranged above each other like a card deck, using the output device. In other words, the virtual elements are visualized as cards on the palm of the first hand. In most embodiments, the virtual elements are attached to at least one of the user's hands. The method provides a user interface for hand interaction with virtual elements, for example for viewing a content gallery or data exploration.

14 Claims, 6 Drawing Sheets

Figure 1:
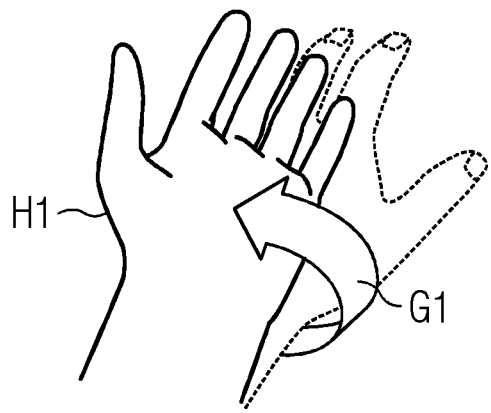

(51) Int. Cl.
  G06V 40/10    (2022.01)
  G06V 40/20    (2022.01)
  G06F 3/01     (2006.01)
  G06F 3/04845  (2022.01)
  G06F 3/0485   (2022.01)
  G06T 19/00    (2011.01)
(52) U.S. Cl.
  CPC ........ *G06F 3/0485* (2013.01); *G06F 3/04845* (2013.01); *G06T 19/006* (2013.01); *G06V 20/20* (2022.01); *G06V 40/10* (2022.01); *G06V 40/28* (2022.01)

(56) References Cited

U.S. PATENT DOCUMENTS

| | | | | |
|---|---|---|---|---|
| 2010/0211872 | A1* | 8/2010 | Rolston | G06F 3/0488 715/830 |
| 2012/0113223 | A1* | 5/2012 | Hilliges | G06F 3/011 348/46 |
| 2015/0142698 | A1* | 5/2015 | Ramakrishnan | G06Q 40/06 705/36 R |
| 2015/0248170 | A1* | 9/2015 | Abovitz | G02B 27/42 345/633 |
| 2015/0264338 | A1 | 9/2015 | Ueno et al. | |
| 2016/0224123 | A1* | 8/2016 | Antoniac | G06F 3/04815 |
| 2017/0228130 | A1 | 8/2017 | Palmaro et al. | |
| 2018/0075658 | A1* | 3/2018 | Lanier | G06T 11/001 |
| 2018/0300897 | A1* | 10/2018 | Woods | G06F 3/0483 |
| 2019/0324549 | A1* | 10/2019 | Araki | G06V 40/28 |
| 2020/0005026 | A1* | 1/2020 | Andersen | G06V 40/113 |

OTHER PUBLICATIONS

"HTC Vive", obtainable on the internet on Jan. 15, 2019 at https://en.wikipedia.org/wiki/HTC_Vive.

"Microsoft HoloLens", obtainable on the internet on Jan. 15, 2019 at ttps://en.wikipedia.org/wiki/Microsoft_HoloLens.

Arnand Agarawala: Enriching the Desktop Metapherwith Physics, Piles and the Pen; Master Thesis Deparlment of Computer Science University of Toronto; Jan. 1, 2006 ; pp. 1-102; A thesis submitted in conformity with the requirements for the degree of Master of Science.

"Wired glove", obtainable on the internet on Jan. 15, 2019 at https://en.wikipedia.org/wiki/Wired_glove.

PCT International Search Report and Written Opinion of International Searching Authority dated Apr. 28, 2020 corresponding to PCT International Application No. PCT/EP2020/052098 filed Jan. 29, 2020.

European Search Report for Application No. 19156426.9, dated Jul. 24, 2019.

* cited by examiner

METHOD AND SYSTEM FOR VIEWING VIRTUAL ELEMENTS

CROSS-REFERENCE TO RELATED APPLICATIONS

This application claims priority to PCT Application No. PCT/EP2020/052098, having a filing date of Jan. 29, 2020, which is based off of EP Application No. 19156426.9, having a filing date of Feb. 11, 2019, the entire contents both of which are hereby incorporated by reference.

FIELD OF TECHNOLOGY

The following relates to viewing and exploring content using hand interaction in virtual reality (VR) or augmented reality (AR), in particular viewing and navigating a gallery of images or other types of content. The content can be displayed using virtual elements with a primarily flat appearance, for example windows, documents, search results or images.

BACKGROUND

The document "Microsoft HoloLens", obtainable on the internet on Jan. 15, 2019 at https://en.wikipedia.org/wiki/Microsoft HoloLens, describes an output device for outputting visual images of virtual elements in augmented reality. Furthermore, the document "HTC Vive", obtainable on the internet on Jan. 15, 2019 at https://en.wikipedia.org/wiki/HTC_Vive, describes an output device for outputting visual images of virtual elements in virtual reality. The documents "Leap Motion", obtainable on the internet on Jan. 15, 2019 at https://en.wikipedia.org/wiki/Leap_Motion, and "Wired glove", obtainable on the internet on Jan. 15, 2019 at https://en.wikipedia.org/wiki/Wired_glove, each describe a tracking device capable of tracking hand and finger motion of the bare hand of a user.

For developing user interfaces in augmented or virtual reality, a common approach is to adopt metaphors known from desktop graphical user interfaces, such as windows.

SUMMARY

An aspect relates to provide an alternative to the state of the art.

According to the method for viewing virtual elements, the following steps are executed by at least one processor:
tracking hand motion of a user, using a tracking device,
recognizing a first gesture when the user turns a palm of a first-hand towards his face,
outputting a first virtual element and a set of virtual elements above the palm of the first hand, the virtual elements being arranged above each other like a card deck, using an output device, with the output device being configured for outputting the virtual elements in augmented or virtual reality,
recognizing a second gesture when the user grabs the first virtual element with a second hand,
recognizing a third gesture when the user moves the second hand away from the first hand, and
outputting the set of virtual elements, the virtual elements extending between the first hand and the second hand, using the output device.

The system for viewing virtual elements includes a tracking device, configured for tracking hand motion of a user. It further includes an output device, being configured for the output of virtual elements in augmented or virtual reality. It also includes at least one processor, programmed for:
recognizing a first gesture when the user turns a palm of a first-hand towards his face,
outputting a first virtual element and a set of virtual elements above the palm of the first hand, the virtual elements being arranged above each other like a card deck, using the output device,
recognizing a second gesture when the user grabs the first virtual element with a second hand,
recognizing a third gesture when the user moves the second hand away from the first hand, and
outputting the set of virtual elements, the virtual elements extending between the first hand and the second hand, using the output device.

The method can visualize the virtual elements as cards on the palm of the first hand. In most embodiments, the virtual elements are attached to at least one of the user's hands.

The method provides a user interface for hand interaction with virtual elements, for example for viewing a content gallery or data exploration. The virtual elements each have a primarily flat appearance and can be displayed as windows, documents, search results, images, etc. The method allows the user to use his hands in an intuitive and natural way, as if he would hold a card deck or a slinky in his hands.

The virtual elements extending between the first hand and the second hand can be arranged above each other like a card deck, or like the turns of a spring.

According to an embodiment of the method, the first virtual element is attached to the first hand and hovering above its palm, and in particular following movements of the first hand, until the second gesture is recognized.

According to this embodiment, the first virtual element is attached to the palm of the first hand of the user, until it is grabbed by the second hand. This means that the visual depiction of the first virtual element will stay in the same position relative to the palm if the user moves the first hand. For example, the first virtual element can hover above the palm.

According to an embodiment of the method, the following additional steps are executed by at least one processor:
recognizing a fourth gesture, in which the user is scrolling through the set of virtual elements, and
rotating the order of the elements of the set of virtual elements, using the output device.

According to an embodiment of the method, the following additional steps are executed by at least one processor:
recognizing a fifth gesture when the user moves the second hand away from the first hand along a curve, and
outputting the set of virtual elements, the virtual elements extending between the first hand and the second hand along the curve, using the output device.

This embodiment allows flexible and dynamic scaling of the set of virtual elements in three dimensions. For example the card deck visualization can be expanded into a semicircle in an analogy to a slinky toy. The spring-like visualization is then used as a metaphor for displaying the content gallery.

According to an embodiment of the method, the following additional steps are executed by at least one processor:
recognizing a sixth gesture when the user moves the first hand and/or the second hand away from his body, and
outputting the set of virtual elements, the virtual elements facing and surrounding the user, using the output device.

This embodiment allows the use of a push gesture to change the visualization and/or shape of the gallery.

According to an embodiment of the method, the following additional steps are executed by at least one processor:
recognizing a seventh gesture when the user moves the first hand and/or the second hand towards his body, and
outputting the set of virtual elements, the virtual elements extending between the first hand and the second hand along a curve, using the output device.

This embodiment allows the use of a pull gesture to change the visualization and/or shape of the gallery back to the spring-like visualization.

According to an embodiment of the method, the following additional steps are executed by at least one processor:
recognizing an eighth gesture when the user drags one of the virtual elements sideways, and
outputting a second set of virtual elements, the second set extending sideways, using the output device.

This embodiment provides multi-dimensional data access.

According to an embodiment of the method, the following additional steps are executed by at least one processor:
recognizing a ninth gesture when the user raises and/or drops the first hand,
calculating a swaying movement for the set of virtual elements based on a physics simulation of a spring, and
outputting the swaying movement, using the output device.

This embodiment introduces gamification elements into the rather mundane task of exploring a content gallery and thus facilitates a positive user experience.

According to an embodiment of the method, the following additional steps are executed by at least one processor:
outputting additional virtual elements around the wrist of the first hand, using the output device, and
representing a different set of virtual elements with each additional virtual element.

This embodiment provides access to multiple menus or sets of virtual elements.

According to an embodiment of the method, the following additional steps are executed by at least one processor:
recognizing a sixteenth gesture, and
rotating the first virtual element and the additional virtual elements around the wrist of the first hand.

This embodiment provides easy selection among the multiple menus or sets of virtual elements.

According to an embodiment of the system, the output device is an augmented reality headset, a virtual reality headset or a holographic display.

The computer-readable storage media has stored thereon instructions executable by one or more processors of a computer system, wherein execution of the instructions causes the computer system to perform the method.

The computer program is being executed by one or more processors of a computer system and performs the method.

BRIEF DESCRIPTION

Figure 2:
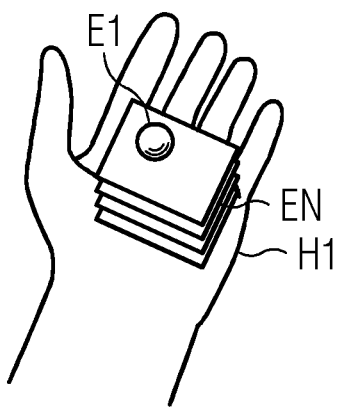
Figure 3:
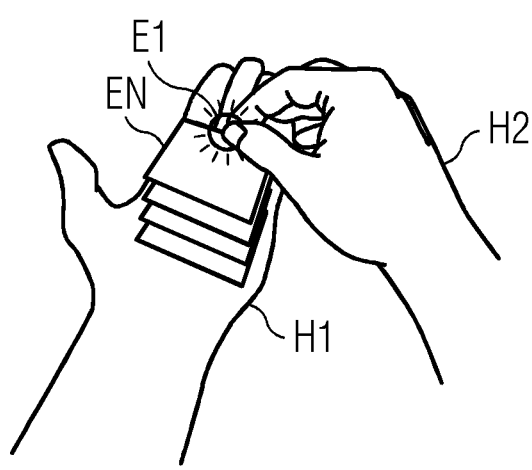
Figure 4:
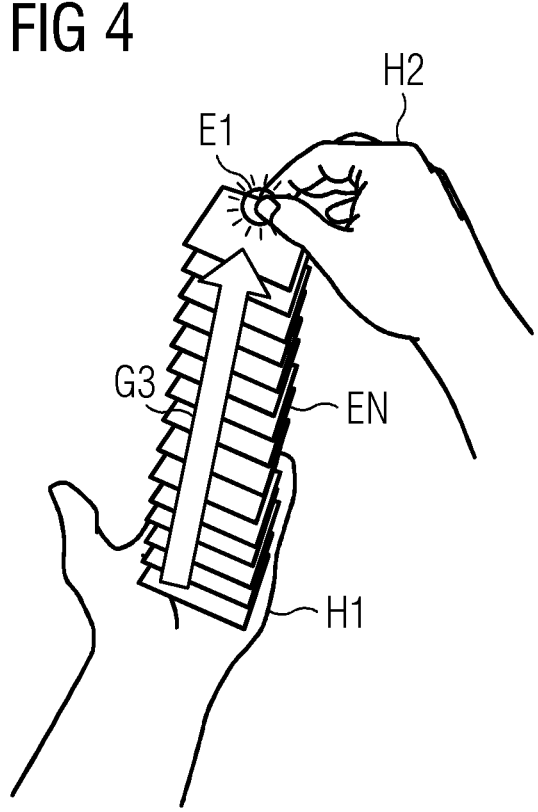
Figure 5:
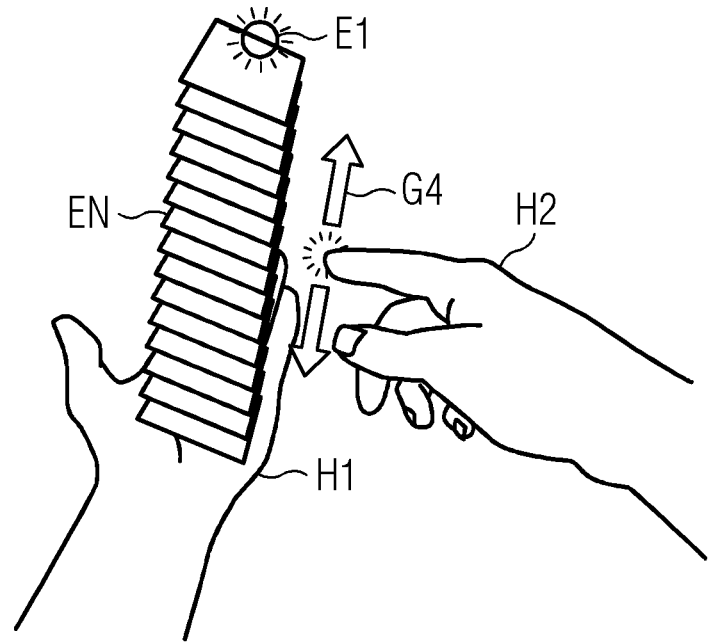
Figure 6:
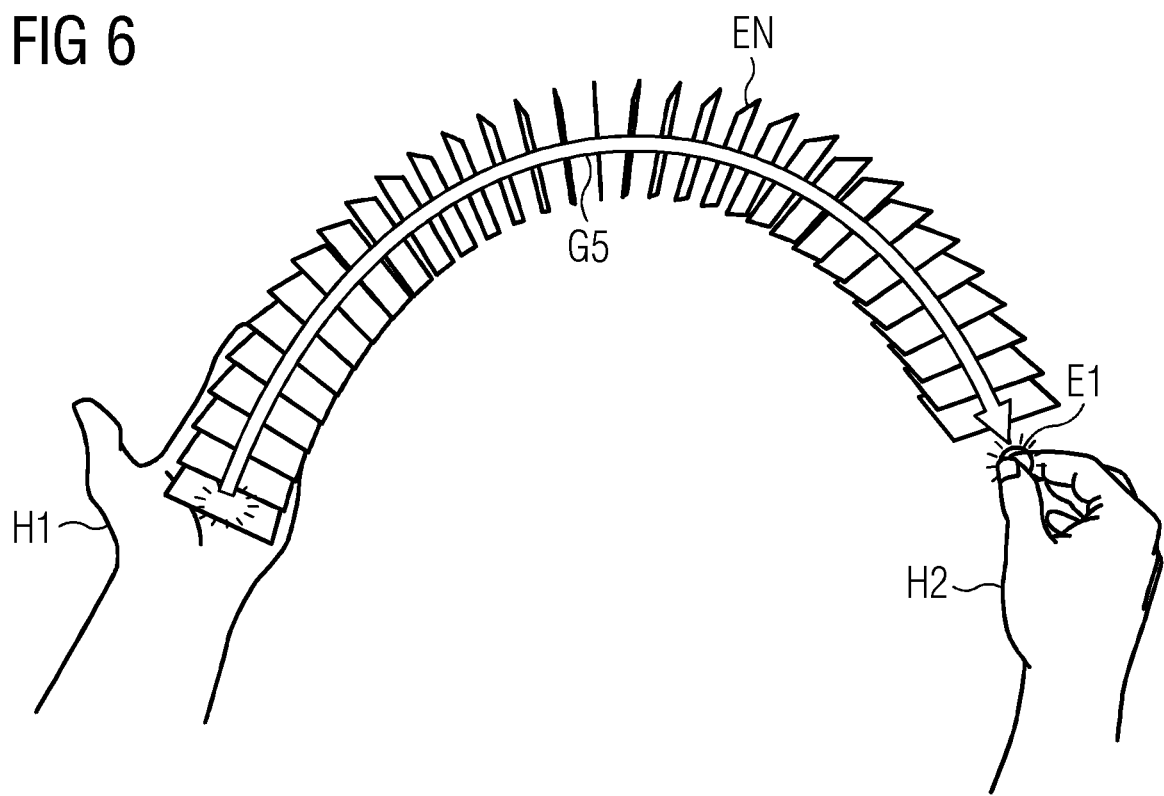
Figure 7:
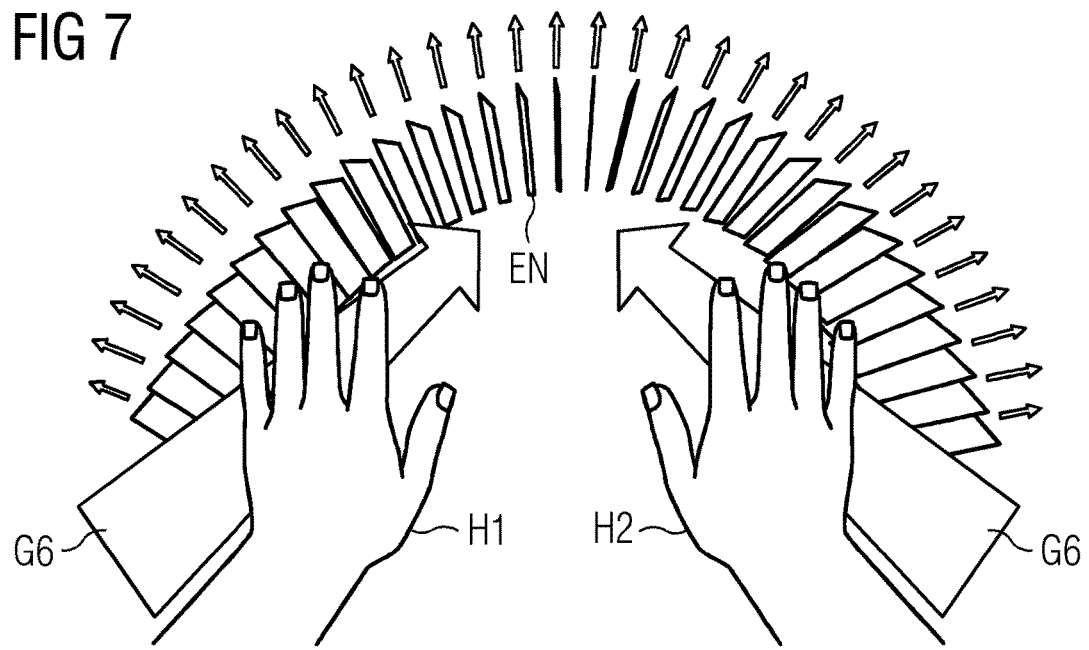
Figure 8:
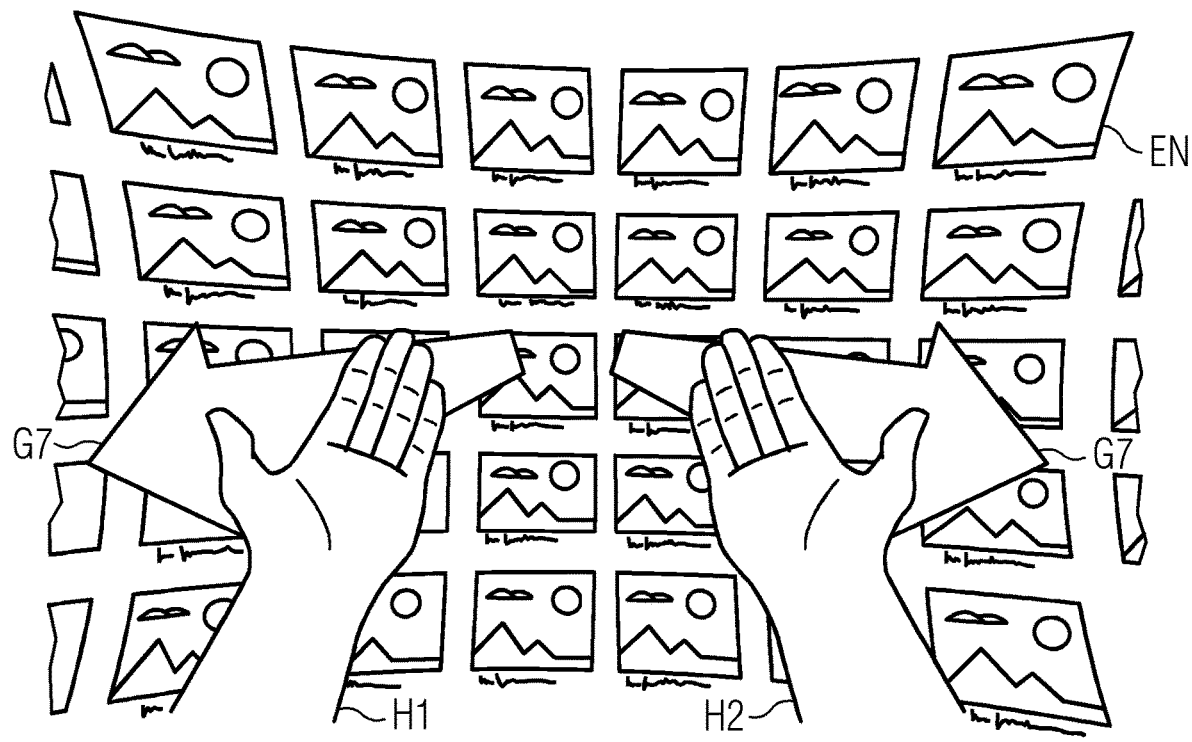
Figure 9:
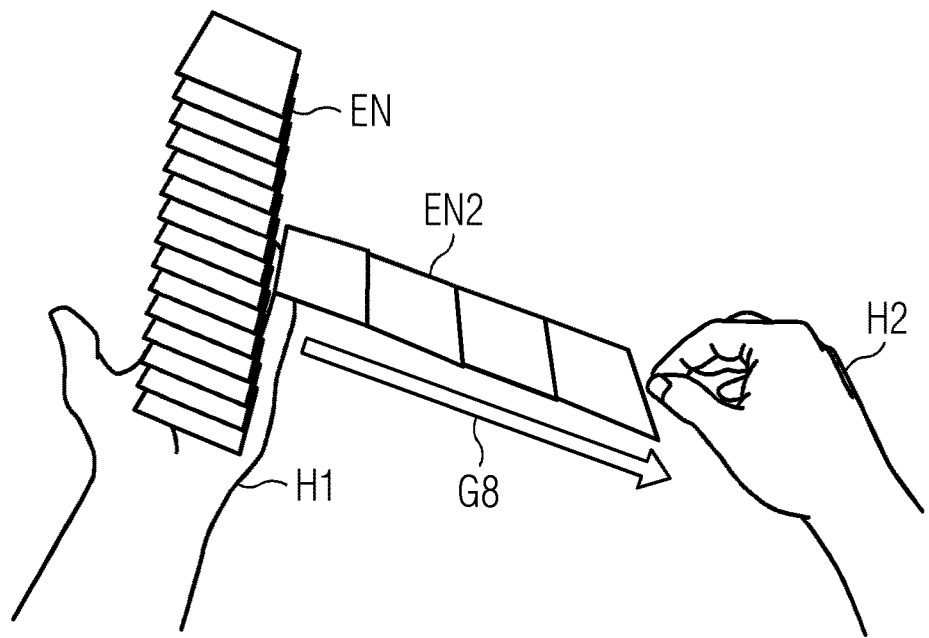
Figure 10:
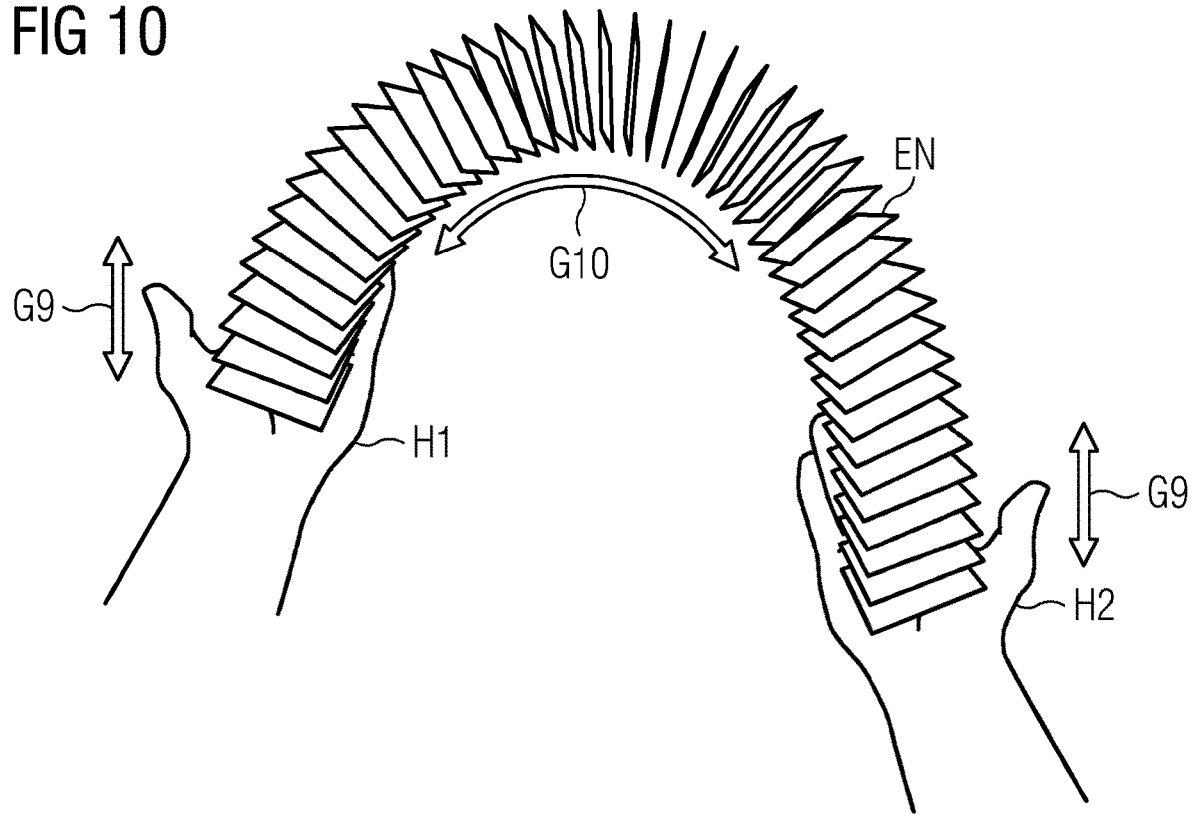
Figure 11:
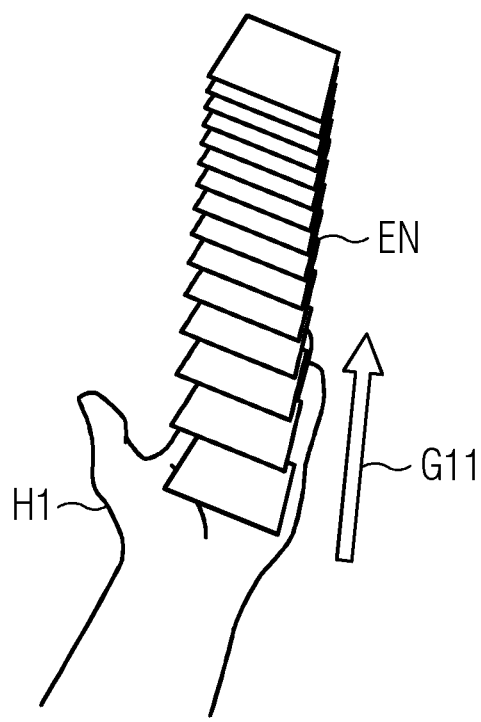
Figure 12:
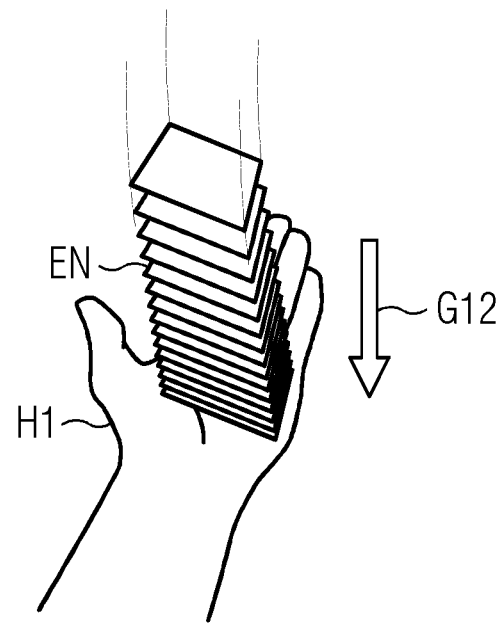
Figure 13:
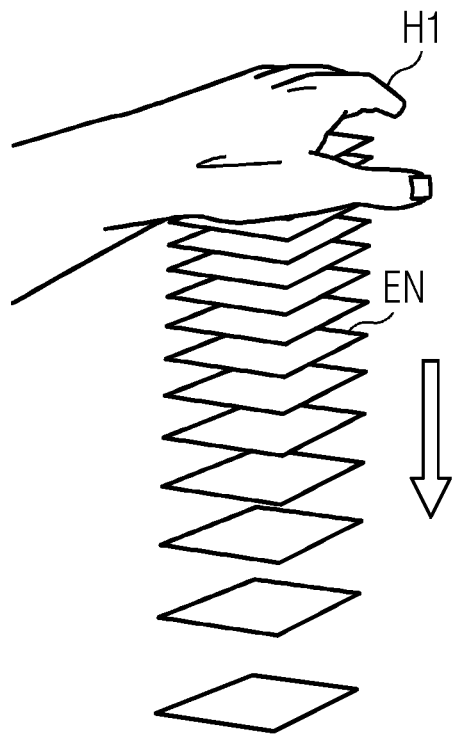
Figure 14:
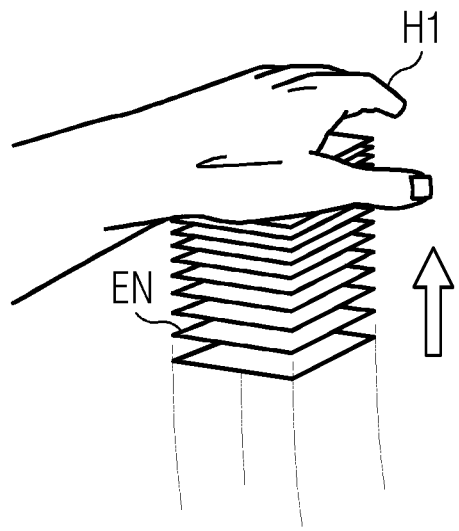
Figure 15:
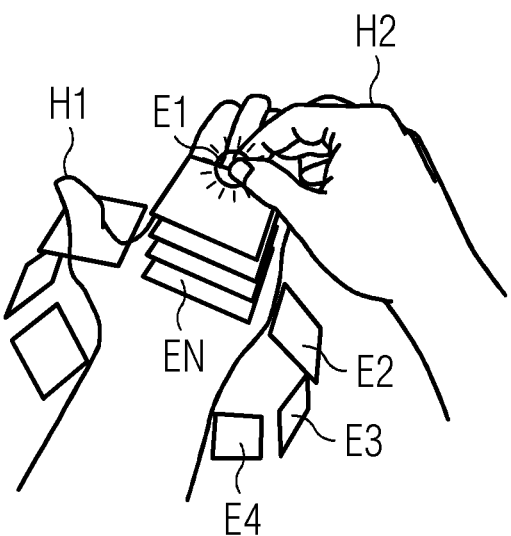
Figure 16:
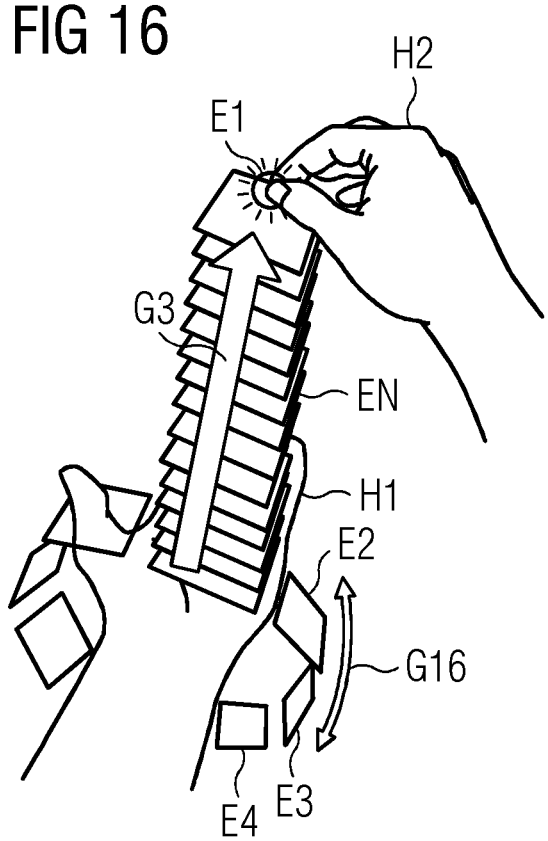
Figure 17:
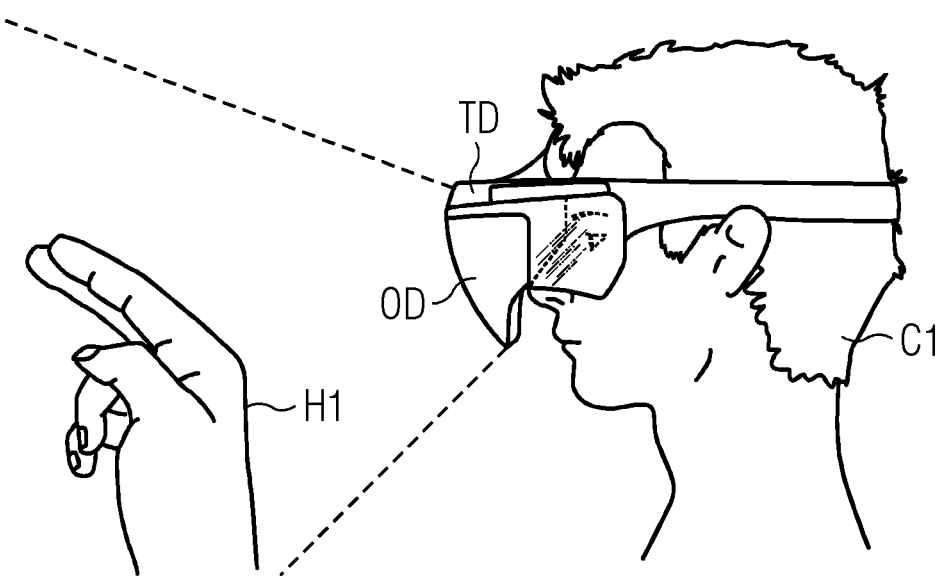

Some of the embodiments will be described in detail, with reference to the following figures, wherein like designations denote like members, wherein:

FIG. 1 a recognition of a first gesture G1, in which a user turns a first hand H1;

FIG. 2 an appearance of a menu in the palm of the first hand H1, consisting of a set of virtual elements EN and a first virtual element E1, acting as a control point for the set of virtual elements EN;

FIG. 3 a recognition of a second gesture, in which a user grabs the first virtual element E1 with a second hand H2;

FIG. 4 a recognition of a third gesture G3, in which the user moves the second hand H2 away from the first hand H1, extending the set of virtual elements EN as a card deck;

FIG. 5 a recognition of a fourth gesture G4, in which the user is scrolling through the set of virtual elements EN;

FIG. 6 a recognition of a fifth gesture G5, which results in a further expansion of the set of virtual elements EN as it takes the shape of a curve;

FIG. 7 a recognition of a sixth gesture G6, in which the user pushes the set of virtual elements EN away;

FIG. 8 an exploded view of the set of virtual elements EN, surrounding the user like a sphere, and a recognition of a seventh gesture G7, in which the user pulls the gallery towards him;

FIG. 9 a recognition of an eighth gesture G8, accessing a second set of virtual elements EN2;

FIG. 10 movements of the set of virtual elements EN based on a physics simulation;

FIG. 11 a recognition of an eleventh gesture G11, in which the user raises the first hand H1, and a corresponding response of the visualization of the set of virtual elements EN;

FIG. 12 a recognition of a twelfth gesture G12, in which the user lowers the first hand H1, and a corresponding response of the visualization of the set of virtual elements EN;

FIG. 13 an expansion of the set of virtual elements EN based on a gravity simulation;

FIG. 14 a swinging back movement of the set of virtual elements EN;

FIG. 15 a display of additional virtual elements around the wrist of the first hand H1;

FIG. 16 a sixteenth gesture G16, in which the user swipes to rotate the additional virtual elements, or turns his wrist to do so; and FIG. 17 an arrangement with a user U wearing an output device OD, which is equipped with a tracking device TD.

DETAILED DESCRIPTION

FIG. 1 shows a first gesture G1 that is being recognizing when a user turns the palm of a first hand H1 towards his face. As will be described in the context of FIG. 17, the user is wearing a head-mounted display as an output device, which is outputting virtual elements in augmented or virtual reality. The output device is equipped with a tracking device, which is suitable for tracking hand movements of the first hand H1 and a second hand of the user. In addition, the tracking device or a second tracking device may be capable of tracking finger movements. Some of the gestures that are described in the following may be based not only on hand movements, but in addition also on finger movements. As an alternative, all gestures are recognized by evaluating hand movements only. A processor is programmed to recognize the first gesture G1.

When the user turns the palm of one of his hands towards his face, a set of virtual elements EN (a gallery) appears in its initial stage, as is depicted in FIG. 2. A first virtual element E1 is displayed over the top end of the set of virtual elements EN and is acting as a visible grab point (in this example visualized as a sphere). The output device displays the first virtual element E1 as being attached to the first hand H1 and hovering above its palm, and in particular following movements of the first hand H1. When the user turns the palm of the first hand H1 away in this stage, the gallery disappears. The first virtual element E1 is acting as a control point for the set of virtual elements EN.

FIG. 3 shows a second gesture, in which the user grabs the first virtual element E1 with a second hand H2.

FIG. 4 shows a third gesture G3, in which the user moves the second hand H2 away from the first hand H1. In doing so, the user can extend the set of virtual elements EN (the gallery) between his hands to any length. The gallery can now contain a greater number of items, calculated from the distance between the hands and a default distance between each item.

The user can now release the first element E1 with his right hand H2. The gallery stays in its extended form.

FIG. 5 shows a fourth gesture G4, in which the user is scrolling through the set of virtual elements EN with a fingertip of his right hand H2. Depending on the scroll direction, new virtual elements appear at the top and old virtual elements disappear at the bottom, or vice versa.

Any virtual element can be opened and displayed in a larger size or in a full screen mode by touching ("clicking") it.

There can be a blending function for the virtual elements at the top and bottom of the gallery: the n top-most and m bottom-most virtual elements can fade out based on size, transparency or color. There can also be a highlighting function for the virtual elements that are close to the selecting hand or finger, also using size, transparency or color (e.g. the closest virtual element to the finger gets a yellow glow and is 1.5 times larger than all the other virtual elements in the gallery).

If the user now turns the palm of his first hand H1 away, the set of virtual elements stays visible as a card stack and is positioned in world space.

FIG. 6 shows a fifth gesture G5, which results in a further expansion of the set of virtual elements EN, until it takes the shape of a curve, for example a semi-circle or a spline-based shape.

The card stack shaped visualization of the set of virtual elements EN then detaches from the palm of the left hand H1 and is now positioned relative to world space. Just as in the previous stage, scrolling through the virtual elements is possible.

FIG. 7 shows the execution of a sixth gesture G6 by the user. Here, the user performs a "push" gesture towards the extended set of virtual elements EN, in order to explode the gallery.

The virtual elements of the card stack visualization then explode into a sphere surrounding the user, as depicted in FIG. 8. The visualization of the set of virtual elements can take any shape surrounding the user: a wall, a cube, a 3D grid, a half-dome, etc. This enables the user to see the entire content of a folder, a search query or a knowledge graph and explore it.

FIG. 8 shows the execution of a seventh gesture G7 by the user. Here, the user performs a "pull" gesture on the spherical gallery, and the virtual elements return back to the original more compact semi-circle.

FIG. 9 shows a further embodiment, in which the visualization of the virtual elements as a card stack supports multi-dimensional data, such as a knowledge graph, subfolders, or related content lists. Here, the user performs an eighth gesture G8, in which he grabs one of the virtual elements with his right hand H2 and drags it to the side. The new content, in other words a second set of virtual elements EN2 representing another dimension of the data, appears between the virtual element and the right hand H2.

FIG. 10 shows an embodiment that contains gamification elements for a positive user experience. Similar to a slinky toy or a soft spring, the virtual elements can be swayed between the hands based on a physics simulation and move from one hand to the other. For example, the user can perform a ninth gesture G9, in which he raises and lowers his left hand H1 and/or his right hand H2, or a tenth gesture G10, in which he moves his hands in opposite directions. Based on a physics simulation, corresponding movements of the set of virtual elements EN are calculated and displayed.

If the user moves his hand up and down slightly, the card stack expands and contracts based on a physics simulation. It never leaves the hand. FIG. 11 illustrates an eleventh gesture G11 in which the user raises the first hand H1. FIG. 12 shows a twelfth gesture G12 in which the user lowers the first hand H1.

FIG. 13 shows the user turning the first hand H1 upside down. The card deck visualization of the set of virtual elements EN expands and contracts based on a physics simulation like a spring. FIG. 14 shows that swinging back movement.

FIG. 15 shows an embodiment in which a second virtual element E2, a third virtual element E3, a fourth virtual element E4 and further additional virtual elements are displayed around the wrist of the first hand H1. Each additional virtual element represents a different set of virtual elements. In this variant, instead of showing only one card deck, there are several card deck starting points wrapped around the first hand H1 of the user. In other words, multiple gallery starting points are wrapped around the first hand H1.

FIG. 16 shows a sixteenth gesture G16, in which the user swipes to rotate the additional virtual elements, or turns his wrist to do so. Each additional virtual element can be extended into its own gallery.

FIG. 17 shows an arrangement with a user U wearing a head-mounted display as an output device OD, which is outputting virtual elements in augmented or virtual reality. The output device OD is equipped with a tracking device TD which is suitable for tracking hand movements of a first hand H1 and a second hand of the user U. The arrangement further encompasses a processor which can be programmed to execute one of the previously described embodiments of the method. The processor could be located in the output device OD. Alternatively, it could be located in a notebook or graphics workstation with a wired or wireless connection to the output device OD. Furthermore, the steps of the method and its various embodiments could be performed by several processors each dedicated to one or more of the steps.

The method can be executed by a processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the computer system and/or another processor may be configured to implement the acts described herein.

The above-described method may be implemented via a computer program product (non-transitory computer readable storage medium having instructions, which when executed by a processor, perform actions) including one or more computer-readable storage media having stored thereon instructions executable by one or more processors of a computing system. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. Computer readable storage media include various types of volatile and non-volatile storage media. The functions, acts, or tasks illustrated in the figures or described herein may be executed in response to one or more sets of instructions stored in or on computer readable storage media. The functions, acts, or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for viewing virtual elements,
with the following steps being executed by at least one processor:
   tracking hand motion of a user, using a tracking device,
   recognizing a first gesture when the user turns a palm of a first hand towards his face,
   outputting a first virtual element and a set of virtual elements above the palm of the first hand,
   the first virtual element acting as a control point for the set of virtual elements, the virtual elements being arranged above each other like a card deck, using an output device, with the output device being configured for outputting the virtual elements in augmented or virtual reality,
   recognizing a second gesture when the user grabs the first virtual element with a second hand,
   recognizing a third gesture when the user moves the second hand away from the first hand, and
   outputting the set of virtual elements, the virtual elements extending between the first hand and the second hand, using the output device.

2. The method according to claim 1,
with the first virtual element being attached to the first hand and hovering above its palm, and in particular following movements of the first hand, until the second gesture is recognized.

3. The method according to claim 1,
with the following additional steps being executed by at least one processor:
   recognizing a fourth gesture, in which the user is scrolling through the set of virtual elements, and
   rotating the order of the elements of the set of virtual elements, using the output device.

4. The method according to claim 1,
with the following additional steps being executed by at least one processor:
   recognizing a fifth gesture when the user moves the second hand away from the first hand along a curve, and
   outputting the set of virtual elements, the virtual elements extending between the first hand and the second hand along the curve, using the output device.

5. The method according to claim 1,
with the following additional steps being executed by at least one processor:
   recognizing a sixth gesture when the user moves the first hand and/or the second hand away from his body, and
   outputting the set of virtual elements, the virtual elements facing and surrounding the user, using the output device.

6. The method according to claim 5,
with the following additional steps being executed by at least one processor:
   recognizing a seventh gesture when the user moves the first hand and/or the second hand towards his body, and
   outputting the set of virtual elements, the virtual elements extending between the first hand and the second hand along a curve, using the output device.

7. The method according to claim 1,
with the following additional steps being executed by at least one processor:
   recognizing an eighth gesture when the user drags one of the virtual elements sideways, and
   outputting a second set of virtual elements, the second set extending sideways, using the output device.

8. The method according to claim 1,
with the following additional steps being executed by at least one processor:
   recognizing a ninth gesture when the user raises and/or drops the first hand,
   calculating a swaying movement for the set of virtual elements based on a physics simulation of a spring, and
   outputting the swaying movement, using the output device.

9. The method according to claim 1,
with the following additional steps being executed by at least one processor:
   outputting additional virtual elements around the wrist of the first hand, using the output device, and
   representing a different set of virtual elements with each additional virtual element.

10. The method according to claim 9,
with the following additional steps being executed by at least one processor:
    recognizing a sixteenth gesture, and
    rotating the first virtual element and the additional virtual elements around the wrist of the first hand.

11. A non-transitory computer-readable storage media having stored thereon:
    instructions executable by one or more processors of a computer system, wherein execution of the instructions causes the computer system to perform the method according to claim 1.

12. A system for viewing virtual elements,
with a tracking device, configured for tracking hand motion of a user,
with an output device, being configured for the output of virtual elements in augmented or virtual reality, and
with at least one processor, programmed for
    recognizing a first gesture when the user turns a palm of a first hand towards his face, outputting a first virtual element and a set of virtual elements above the palm of the first hand, the first virtual element acting as a control point for the set of virtual elements, the virtual elements being arranged above each other like a card deck, using the output device, recognizing a second gesture when the user grabs the first virtual element with a second hand, recognizing a third gesture when the user moves the second hand away from the first hand, and outputting the set of virtual elements, the virtual elements extending between the first hand and the second hand, using the output device.

13. A system according to claim 12, with the output device being an augmented reality headset, a virtual reality headset or a holographic display.

14. A computer program product, comprising a computer readable hardware storage device having computer readable program code stored therein, said program code executable by a processor of a computer system to implement a method, the method comprising:

tracking hand motion of a user, using a tracking device, recognizing a first gesture when the user turns a palm of a first hand towards his face, outputting a first virtual element and a set of virtual elements above the palm of the first hand, the first virtual element acting as a control point for the set of virtual elements, the virtual elements being arranged above each other like a card deck, using an output device, with the output device being configured for outputting the virtual elements in augmented or virtual reality, recognizing a second gesture when the user grabs the first virtual element with a second hand, recognizing a third gesture when the user moves the second hand away from the first hand, and outputting the set of virtual elements, the virtual elements extending between the first hand and the second hand, using the output device.

* * * * *